United States Patent
Takes et al.

(10) Patent No.: US 11,852,068 B1
(45) Date of Patent: Dec. 26, 2023

(54) HYBRID HEAT TRANSFER ASSEMBLY

(71) Applicant: L & M Radiator, Inc., Hibbing, MN (US)

(72) Inventors: Nicholas F. Takes, Hermantown, MN (US); Aaron Patrick Morgan, Britt, MN (US); Charles Eugene Cedar, Jr., Chisholm, MN (US)

(73) Assignee: L & M Radiator, Inc., Hibbing, MN (US)

( * ) Notice: Subject to any disclaimer, the term of this patent is extended or adjusted under 35 U.S.C. 154(b) by 0 days.

(21) Appl. No.: 17/832,980

(22) Filed: Jun. 6, 2022

(51) Int. Cl.
| | |
|---|---|
| *F01P 3/18* | (2006.01) |
| *F01P 3/12* | (2006.01) |
| *F01P 5/02* | (2006.01) |
| *H01M 8/04007* | (2016.01) |
| *H01M 8/04029* | (2016.01) |

(52) U.S. Cl.
CPC ................... *F01P 3/18* (2013.01); *F01P 3/12* (2013.01); *F01P 5/02* (2013.01); *H01M 8/04029* (2013.01); *H01M 8/04074* (2013.01); *F01P 2003/187* (2013.01); *F01P 2060/14* (2013.01); *F01P 2060/18* (2013.01)

(58) Field of Classification Search
CPC .......... F01P 3/18; F01P 3/12; F01P 2003/187; F01P 2060/14
See application file for complete search history.

(56) References Cited

U.S. PATENT DOCUMENTS

| | | | |
|---|---|---|---|
| 7,814,963 B2 | 10/2010 | Adamson et al. | |
| 8,763,418 B2 | 7/2014 | Kim et al. | |
| 2015/0167532 A1 | 6/2015 | Kim | |
| 2015/0217623 A1* | 8/2015 | Hatakeyama | B60L 1/02 |
| | | | 429/62 |
| 2017/0087957 A1* | 3/2017 | Blatchley | B60H 1/321 |
| 2017/0088006 A1* | 3/2017 | Blatchley | B60H 1/323 |
| 2017/0217279 A1* | 8/2017 | Jalilevand | B60H 1/00885 |
| 2018/0215231 A1* | 8/2018 | Porras | B60H 1/323 |
| 2019/0070924 A1* | 3/2019 | Mancini | B60H 1/00564 |
| 2020/0298661 A1* | 9/2020 | Wada | B60H 1/32284 |
| 2020/0324611 A1* | 10/2020 | Yano | B60H 1/32284 |
| 2021/0094390 A1* | 4/2021 | Aikawa | B60H 1/3227 |
| 2021/0283991 A1* | 9/2021 | Tsuboi | B60H 1/3225 |
| 2022/0161629 A1* | 5/2022 | Wada | B60H 1/3208 |

OTHER PUBLICATIONS

Jul. 14, 2023—International Search Report and Written Opinion—PCT/US2023/024421.

* cited by examiner

*Primary Examiner* — Long T Tran
(74) *Attorney, Agent, or Firm* — Banner & Witcoff, Ltd.

(57) ABSTRACT

A hybrid heat transfer assembly includes operating equipment having a coolant loop including a cooling fluid inlet and a cooling fluid outlet. A radiator has a radiator inlet connected to the cooling fluid outlet, and a radiator outlet connected to the cooling fluid inlet. A radiator fan proximate the radiator directs air across the radiator. A chiller includes an evaporator having an evaporator inlet connected to the cooling fluid outlet, and an evaporator outlet connected to the cooling fluid inlet. A compressor is connected to the evaporator, a condenser is connected to the compressor, and an expansion valve is connected to the condenser and evaporator. A refrigerant loop connects the evaporator and compressor, the condenser and compressor, and the expansion valve to the condenser and the evaporator. A condenser fan proximate the condenser directs air across the condenser.

20 Claims, 4 Drawing Sheets

HYBRID HEAT TRANSFER ASSEMBLY

FIELD

Aspects of this invention relate generally to a hybrid heat transfer assembly for heavy-duty equipment, and, in particular, to a hybrid heat transfer assembly for heavy-duty equipment including a radiator and a refrigerant cooling assembly, or chiller.

BACKGROUND

Heavy-duty equipment may include operating equipment such as internal combustion engines, batteries, and fuel cells. Such heat loads may require cooling, which is often provided by a radiator. The operating equipment may also require heating in certain circumstances.

It would be desirable to provide a hybrid heat transfer assembly for heavy-duty equipment that is efficient and low cost, while at the same time provides sufficient cooling for high cooling loads, and may provide sufficient heating when required. Particular objects and advantages will be apparent to those skilled in the art, that is, those who are knowledgeable or experienced in this field of technology, in view of the following disclosure of the invention and detailed description of certain embodiments.

SUMMARY

Aspects of the present invention may be used to advantageously provide a hybrid heat transfer assembly for heavy-duty equipment with both a radiator and a chiller. The hybrid heat transfer assembly may use one or both of the radiator and chiller in order to most efficiently address the heat load requirement of the operating equipment. The radiator may use less power than the chiller to operate and, therefore it may be more cost effective and energy efficient to use the radiator to provide cooling, and supplement the radiator cooling with cooling provided by a chiller. Thus, in some embodiments, the radiator may be sufficient to provide all the cooling necessary for the heat load of the operating equipment. In other embodiments, the chiller may be used to supplement the cooling provided by the radiator. A controller may be configured to control operation of the radiator and chiller to use the most efficient means of cooling the heat load produced by the operating equipment.

In accordance with a first aspect, a hybrid heat transfer assembly includes operating equipment having a coolant loop including a cooling fluid inlet and a cooling fluid outlet. A radiator has a radiator inlet connected to the cooling fluid outlet, and a radiator outlet connected to the cooling fluid inlet. A radiator fan proximate the radiator directs air across the radiator. A chiller includes an evaporator having an evaporator inlet connected to the cooling fluid outlet, and an evaporator outlet connected to the cooling fluid inlet. A compressor is connected to the evaporator, a condenser is connected to the compressor, and an expansion valve is connected to the condenser and evaporator. A refrigerant loop connects the evaporator and compressor, the condenser and compressor, and the expansion valve to the condenser and the evaporator. A condenser fan proximate the condenser directs air across the condenser.

In accordance with another aspect, a hybrid heat transfer assembly includes operating equipment having a coolant loop including a cooling fluid inlet and a cooling fluid outlet. A radiator has a radiator inlet and a radiator outlet, with the radiator inlet being connected to the cooling fluid outlet. A radiator fan is proximate the radiator and is configured to direct air across the radiator. A chiller includes an evaporator having an evaporator inlet connected to the radiator outlet, and an evaporator outlet connected to the cooling fluid inlet. A compressor is connected to the evaporator, and a condenser is connected to the compressor. An expansion valve is connected to the condenser and the evaporator. A refrigerant loop connects the evaporator to the compressor, the condenser to the compressor, and the expansion valve to the condenser and the evaporator. A condenser fan is proximate the condenser and is configured to direct air across the condenser. A temperature sensor is positioned in the coolant loop between the evaporator outlet and the cooling fluid inlet. A controller is operably connected to the temperature sensor and the compressor and is configured to control operation of the compressor.

In accordance with further aspects, a hybrid heat transfer assembly includes operating equipment having a coolant loop including a cooling fluid inlet and a cooling fluid outlet. A radiator has a radiator inlet connected to the cooling fluid outlet, a radiator valve configured to control flow of cooling fluid through the radiator, and a radiator outlet connected to the cooling fluid inlet. A radiator fan is proximate the radiator and is configured to direct air across the radiator. A chiller includes an evaporator having an evaporator inlet connected to the cooling fluid outlet, an evaporator valve configured to control flow of cooling fluid through the evaporator, and an evaporator outlet connected to the cooling fluid inlet. A compressor is connected to the evaporator, and a condenser is connected to the compressor. An expansion valve is connected to the condenser and the evaporator. A refrigerant loop connects the evaporator to the compressor, the condenser to the compressor, and the expansion valve to the condenser and the evaporator. A condenser fan is proximate the condenser and is configured to direct air across the condenser. A heater has a heater inlet connected to the cooling fluid outlet, a heater flow valve configured to control flow of cooling fluid through the heater, and a heater outlet connected to the cooling fluid inlet. A temperature sensor is positioned in the coolant loop between the evaporator outlet and the cooling fluid inlet. A controller is operably connected to the temperature sensor, the compressor, the radiator valve, the evaporator valve, one or more of the fans, the heater, and the heater flow valve. The controller is configured to control operation of the compressor, the radiator valve, the evaporator valve, one or more of the fans, the heater, and the heater flow valve.

From the foregoing disclosure, it will be readily apparent to those skilled in the art, that is, those who are knowledgeable or experienced in this area of technology, that preferred embodiments of a hybrid heat transfer assembly may provide a significant technological advance in terms of energy efficient heat transfer. These and additional features and advantages will be further understood from the following detailed disclosure of certain preferred embodiments.

Figure 1:
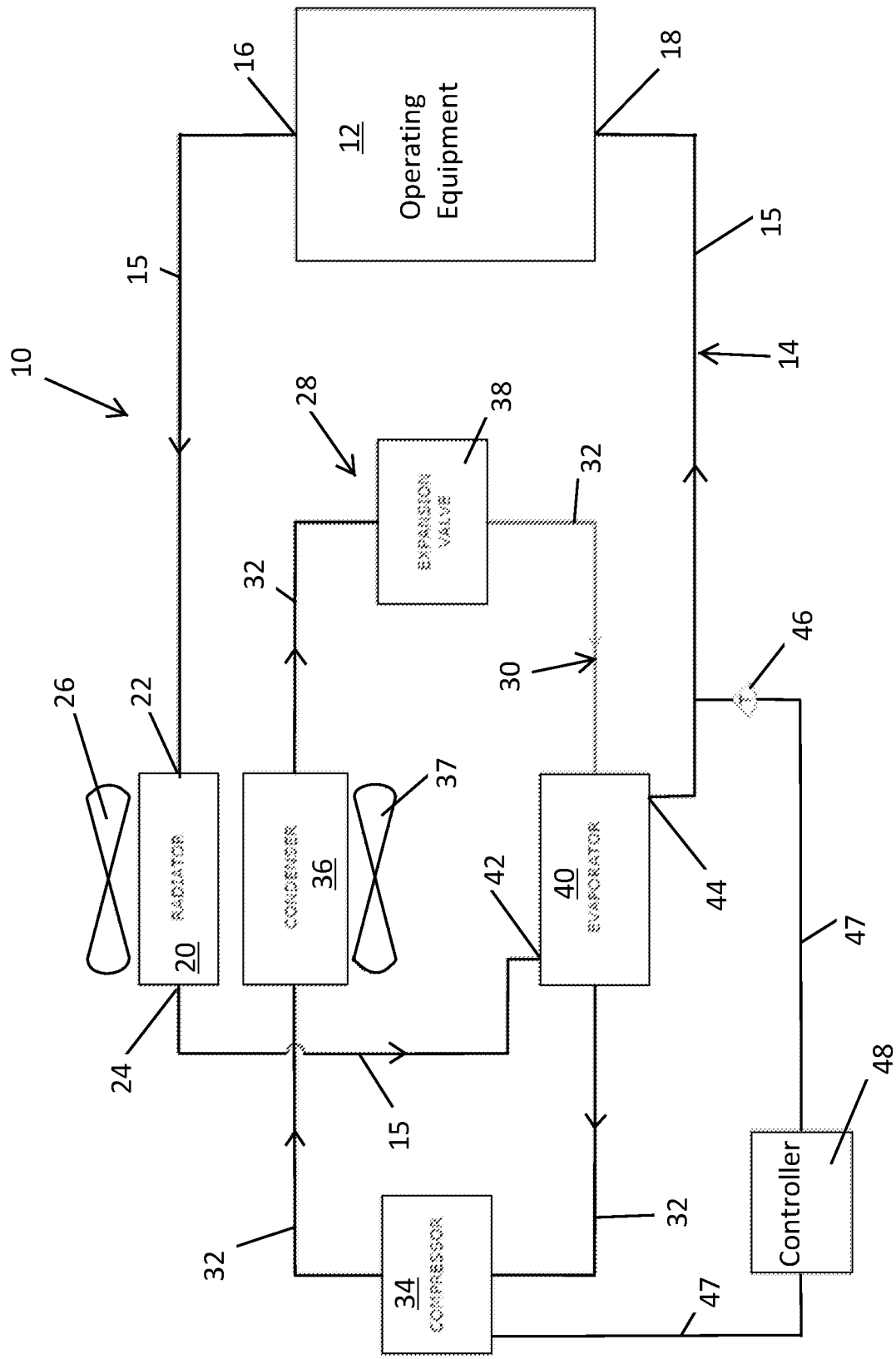
FIG. 1 is a schematic view of a hybrid heat transfer assembly including a radiator and a chiller connected in series.

The figures referred to above are not drawn necessarily to scale and should be understood to provide a representation of the hybrid heat transfer assembly, illustrative of the principles involved. Some features of the hybrid heat transfer assembly depicted in the drawings have been enlarged or distorted relative to others to facilitate explanation and understanding. The same reference numbers are used in the drawings for similar or identical components and features shown in various alternative embodiments. Hybrid thermal management assemblies as disclosed herein would have configurations and components determined, in part, by the intended application and environment in which they are used.

DETAILED DESCRIPTION OF CERTAIN PREFERRED EMBODIMENTS

The present invention may be embodied in various forms. An embodiment of a hybrid heat transfer assembly 10 for heavy duty equipment is shown in FIG. 1. For convenience, the terms "upper" and "lower" and "top" and "bottom" are used herein to differentiate between the upper and lower ends of the hybrid heat transfer assembly 10 and particular components of the assembly. It is to be appreciated that "upper" and "lower" and "top" and "bottom" are used only for ease of description and understanding and that they are not intended to limit the possible spatial orientations of the cooling assembly or its components during assembly or use.

The term "substantially", as used herein, is meant to mean mostly, or almost the same as, within the constraints of sensible commercial engineering objectives, costs, manufacturing tolerances, and capabilities in the field of heavy duty equipment thermal management assembly manufacturing and use. Similarly, the term "approximately" as used herein is meant to mean close to, or about a particular value, within the constraints of sensible commercial engineering objectives, costs, manufacturing tolerances, and capabilities in the field of heavy duty equipment thermal management assembly manufacturing and use.

Hybrid heat transfer assembly 10 may be configured to provide cooling for operating equipment 12 of a piece of heavy-duty equipment. Operating equipment 12 can take various forms. For example, operating equipment 12 may be an internal combustion engine, a battery, or a fuel cell used to provide power to a piece of heavy-duty equipment such as a large mining haul truck, a generator, an excavator, or any other type of mobile or stationary equipment. Other types of operating equipment will become readily apparent to those skilled in the art, given the benefit of this disclosure.

Hybrid heat transfer assembly 10 may include a coolant loop 14 configured to extract heat generated by operating equipment 12. Coolant loop 14 may include one or more pipes 15 that can carry a coolant, such as a liquid, throughout hybrid heat transfer assembly 10. Pipes 15 may be rubber hoses, metal pipes, or any type of conduit that is suitable for carrying heated coolant throughout hybrid heat transfer assembly 10. Suitable forms for pipes 15 will become readily apparent to those skilled in the art, given the benefit of this disclosure.

Coolant passing through coolant loop 14 may be heated by operating equipment 12, then cooled by components of hybrid heat transfer assembly 10, and then returned to operating equipment 12 to once again absorb heat. In certain embodiments, the coolant in coolant loop 14 may be water, or a mixture of water and antifreeze, deionized water, or dielectric coolant. Other suitable coolants for coolant loop 14 will become readily apparent to those skilled in the art, given the benefit of this disclosure.

Coolant loop 14 may include a cooling fluid outlet 16 that directs the coolant out of operating equipment 12 to components of hybrid heat transfer assembly 10 to be cooled. Coolant loop 14 may also include a cooling fluid inlet 18 that directs the coolant cooled by components of hybrid heat transfer assembly 10 back into operating equipment 12.

A radiator 20 may include a radiator inlet 22 that is connected by a pipe 15 of coolant loop 14 to cooling fluid outlet 16 of operating equipment 12. Radiator 20 may also include a radiator outlet 24. The coolant flowing out through cooling fluid outlet 16 of operating equipment 12 may then pass through radiator 20, which may cool the heated coolant. A radiator fan 26 may be positioned proximate radiator 20, and may direct air across radiator 20 to cool the heated coolant passing through radiator 20 in known fashion. Radiator 20 may be a fin and tube radiator, a bar and plate radiator, or a removable tube radiator. Other suitable radiator types will become readily apparent to those skilled in the art, given the benefit of this disclosure.

Hybrid heat transfer assembly 10 may also include a refrigerant cooling assembly 28, or chiller, that may serve to provide additional cooling to coolant loop 14. Chiller 28 may include a refrigerant loop 30 configured to extract heat generated by operating equipment 12. Refrigerant loop 30 may include one or more pipes 32 that can carry refrigerant throughout chiller 28. The refrigerant passing through refrigerant loop 30 may be R-134A, R-410A, or R-513A. Other suitable refrigerants will become readily apparent to those skilled in the art, given the benefit of this disclosure.

Pipes 32 may be rubber hoses, metal pipes, or any type of conduit that is suitable for carrying the refrigerant throughout chiller 28. Other suitable forms for pipes 32 will become readily apparent to those skilled in the art, given the benefit of this disclosure.

Chiller 28 may include a compressor 34 that may act as a pump to compress the refrigerant gas, thereby creating a pressure difference that drives the refrigerant around refrigerant loop 30 in a continuous cycle. The compressed refrigerant exiting compressor 34 may then pass through a pipe 32 to a condenser 36, which may cool and condense the refrigerant gas to a liquid. A condenser fan 37 may be positioned proximate condenser 36, and may direct air across condenser 36 to cool the heated refrigerant passing through condenser 36 in known fashion.

In the illustrated embodiment, a radiator fan 26 and a separate condenser fan 37 are shown. It is to be appreciated that in certain embodiments, a single fan can be configured to direct air across both radiator 20 and condenser 36. In other embodiments, more than one fan can be configured to direct air across either, or both of radiator 20 and condenser 36.

The liquid may then pass from condenser 36 through a pipe 32 to an expansion valve 38, where pressure from the liquid refrigerant is removed, allowing expansion of the refrigerant to a lower pressure liquid or saturated mixture.

The lower pressure refrigerant may then pass through a pipe 32 to an evaporator 40, which may have an evaporator inlet 42 and an evaporator outlet 44. Coolant exiting radiator 20 through radiator outlet 24 may pass through a pipe 15 of coolant loop 14 into and out of evaporator 40 through evaporator inlet 42 and outlet 44, respectively.

Evaporator 40 serves to absorb heat from the coolant, thereby warming and evaporating the refrigerant passing through evaporator 40. The super-heated gas then passes through a pipe 32 to compressor 34, and then the process in refrigerant loop 30 is repeated. Evaporator 40, therefore, acts as a heat exchanger to absorb heat from the coolant, transferring the heat to the refrigerant.

In such an embodiment, radiator 20 and evaporator 40 are connected in series, such that coolant that absorbs heat from operating equipment 12 may first be cooled by radiator 20, and then additional cooling may be provided by chiller 28. This may be advantageous since radiator 20 may require less power to operate than chiller 28, which may increase the efficiency of operating equipment 12 of the heavy-duty equipment and reduce costs.

In certain embodiments, a temperature sensor 46 may be positioned in coolant loop 14 to monitor the temperature of the coolant. In the illustrated embodiment, temperature sensor 46 is positioned downstream of evaporator 40 and upstream of operating equipment 12. In certain embodiments, temperature sensor 46 may be a thermostat, a thermocouple, or a resistance temperature detector ("RTD"). Temperature sensor 46 may send a signal through wiring 47 to a controller 48 that is operably connected to compressor 34. Controller 48 may be configured to send signals through wiring 47 to control operation of compressor 34. Controller 48 may also be configured to control operation of radiator fan 26 and condenser fan 37.

In certain embodiments, controller 48 may be configured to simply turn any of compressor 34, radiator fan 26, and condenser fan 37 on and off. In other embodiments, controller 48 may be configured to provide variable speed control of any of compressor 34, radiator fan 26, and condenser fan 37, thereby providing more control of the cooling capacity of chiller 28. In certain embodiments, controller 48 may utilize variable frequency drive ("VFD") control to one or more of radiator fan 26, condenser fan 37, and compressor 34 to conserve power.

In certain embodiments, temperature sensor 46 may be positioned in coolant loop 14 downstream of radiator outlet 24 and upstream of evaporator inlet 42. It is to be appreciated that in other embodiments, temperature sensor 46 may be positioned at other locations within coolant loop 14. In certain embodiments, temperature sensor 46 may be positioned directly on a portion of the heavy-duty equipment, such as on batteries or fuel cells, for example, to directly monitor the temperature of those devices. Other suitable locations for temperature sensor 46 will become readily apparent to those skilled in the art, given the benefit of this disclosure.

Controller 48 may be a programmable logic controller ("PLC"), a controller area network ("CAN") bus, or any other type of a computer, such as a personal computer, suitable for controlling the operation of chiller 28. Other types of controllers will become readily apparent to those skilled in the art, given the benefit of this disclosure.

In certain embodiments, controller 48 may operate to close a solenoid valve (not shown) in the refrigerant loop when the coolant reaches a sufficiently low enough temperature, in known fashion. This in turn may cause all the refrigerant to be pumped into condenser 39. The pumping of the refrigerant into condenser 39 will reduce the pressure in refrigerant loop 30, which may trigger a low-pressure switch (not shown) near evaporator 40 that in turn would cut off power to compressor 34. When the coolant temperature subsequently rises beyond a predetermined level, controller 48 may operate to open the solenoid valve, restoring pressure to the refrigerant loop, and turning compressor 34 back on.

Figure 2:
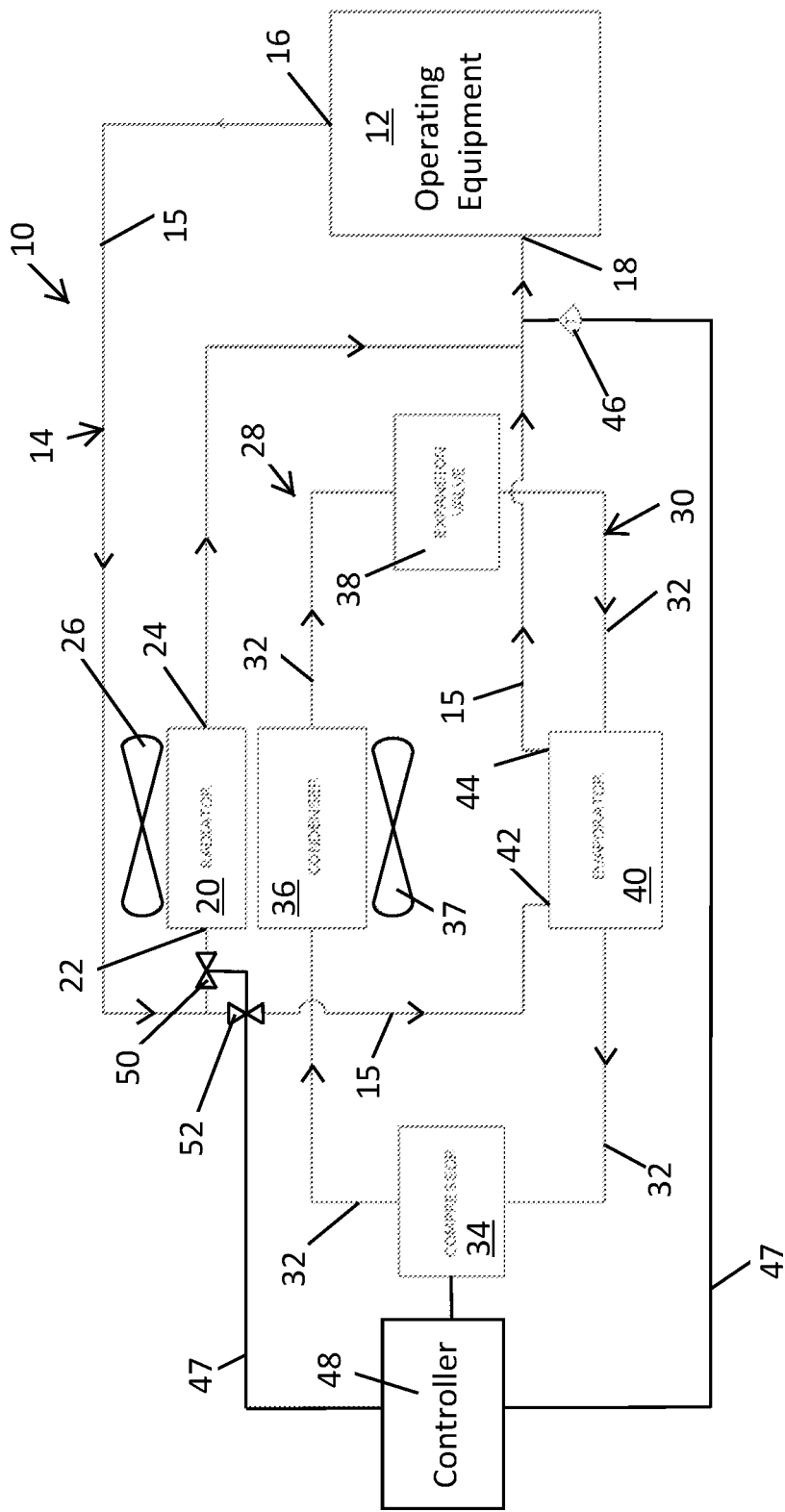
FIG. 2 is a is a schematic view of an alternative embodiment of a hybrid heat transfer assembly including a radiator and a chiller connected in parallel.

Another embodiment of hybrid heat transfer assembly 10 is illustrated in FIG. 2. In this embodiment, radiator 20 and evaporator 40 are connected in parallel. In such an embodiment, cooling for operating equipment 12 can be provided solely by radiator 20, solely by chiller 28, or by both radiator 20 and chiller 28.

In this embodiment, radiator outlet 24 is directly connected by way of a pipe 15 to cooling fluid inlet 18 of operating equipment 12. Evaporator inlet 42 is directly connected by way of a pipe 15 to cooling fluid outlet 16 of operating equipment 12.

A radiator flow valve 50 may be positioned in a pipe 15 proximate radiator 20 to control the flow of coolant through radiator 20. As illustrated here, radiator flow valve 50 may be positioned upstream of radiator inlet 22. In other embodiments, radiator flow valve 50 may be positioned downstream of radiator outlet 24.

Similarly, an evaporator flow valve 52 may be positioned in a pipe 15 to control the flow of coolant through evaporator 40. As illustrated here, evaporator flow valve 52 may be positioned upstream of evaporator inlet 42. In other embodiments, evaporator flow valve 52 may be positioned downstream of evaporator outlet 44.

Controller 48 may be operably connected to each of radiator flow valve 50 and evaporator flow valve 52 to control the flow of coolant through radiator 20 and evaporator 40, respectively. Thus, controller 48 can allow coolant exiting operating equipment 12 to flow only through radiator 20, only through evaporator 40, or through both of radiator 20 and evaporator 40.

It is to be appreciated that in certain embodiments, hybrid heat transfer assembly 10 may include one or more additional chillers to provide additional cooling capacity and/or redundancy for hybrid heat transfer assembly 10. Each of the additional chillers may include a refrigerant loop with pipes, a compressor, a condenser, a condenser fan, an expansion valve, and an evaporator. It is to be appreciated that the evaporator of each additional chiller may be positioned in series or in parallel with radiator 20 and evaporator 40.

Figure 3:
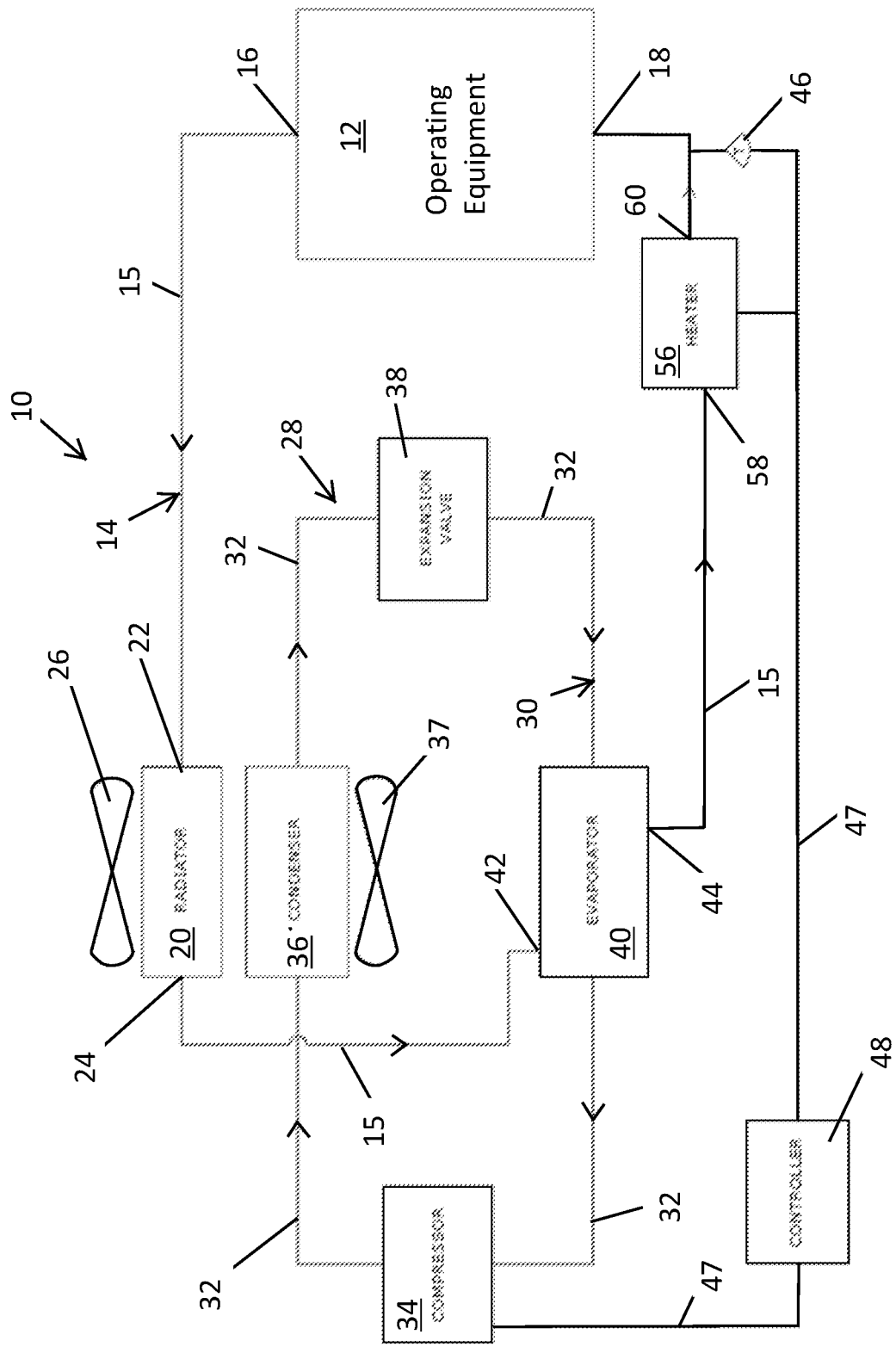
FIG. 3 is a schematic view of another alternative embodiment of a hybrid heat transfer assembly including a radiator, a chiller, and a heater connected in series.

Another embodiment of hybrid heat transfer assembly 10 is illustrated in FIG. 3. In this embodiment, a heater 56 may be connected to coolant loop 14 in order to warm up the coolant. Heater 56 may have a heater inlet 58 and a heater outlet 60. Coolant exiting evaporator 40 through evaporator outlet 44 may pass through a pipe 15 of coolant loop 14 into and out of heater 56 through heater inlet 58 and outlet 60, respectively, and then into operating equipment 12 through cooling fluid inlet 18.

In cold environments, where the ambient temperature is below a desired operating temperature of operating equipment 12, heater 56 may operate to heat the coolant in coolant loop 14. It is to be appreciated that heater 56 may only be required until operating equipment 12 warms up, at which point heater 56 may be shut down. In this embodiment, radiator 20, evaporator 40, and heater 56 are connected in series. Controller 48 may be connected to heater 56 by way of wiring 47 to control operation of heater 56, including turning heater 56 on and off, for example.

In certain embodiments, heater 56 may be an electric heater. Other suitable types of heaters will become readily apparent to those skilled in the art, given the benefit of this disclosure.

Figure 4:
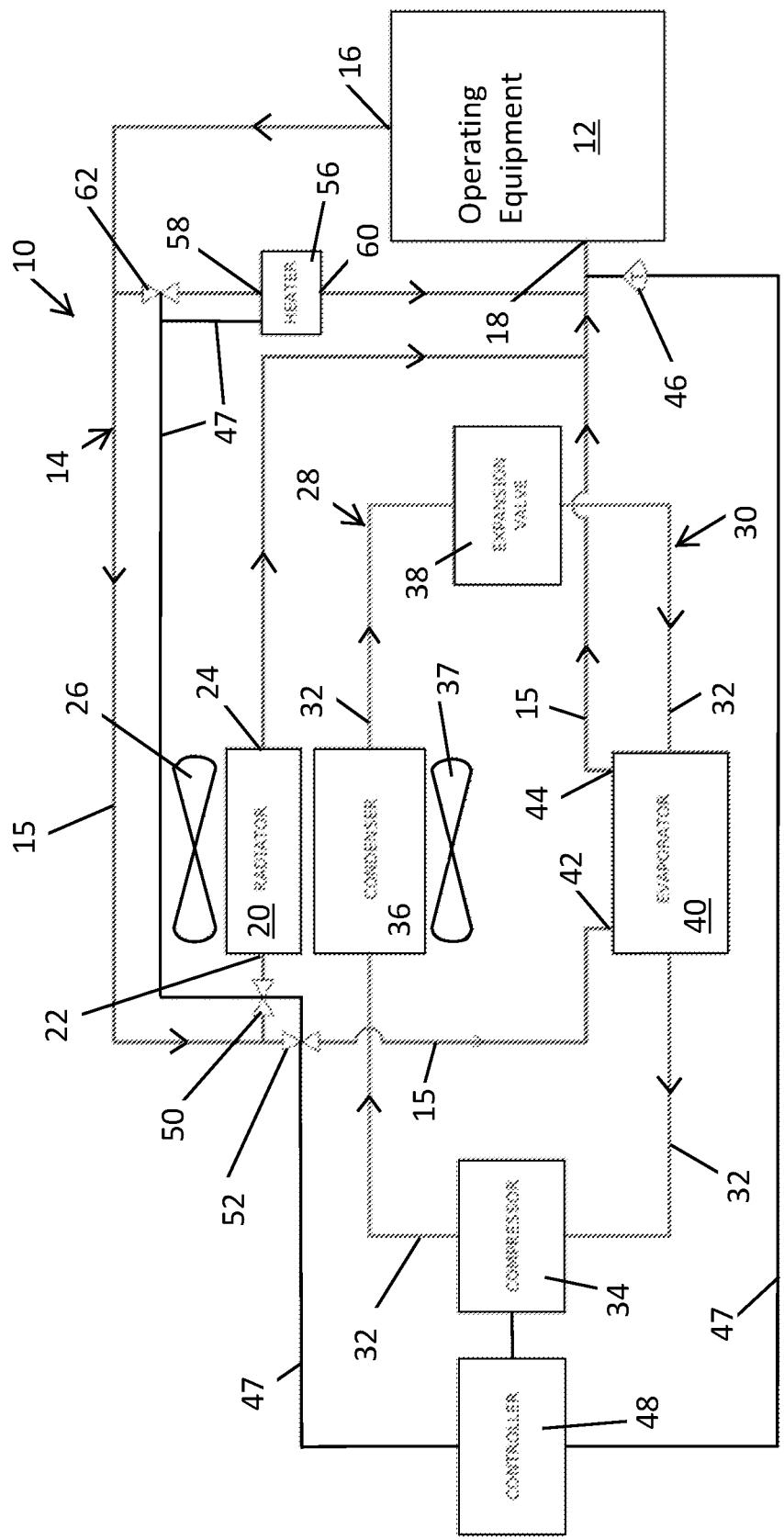
FIG. 4 is a schematic view of another alternative embodiment of a hybrid heat transfer assembly including a radiator, a chiller, and a heater connected in parallel.

Another embodiment of hybrid heat transfer assembly 10 is illustrated in FIG. 4. In this embodiment, radiator 20, evaporator 40, and heater 56 are connected in parallel. In this embodiment, heater outlet 60 is directly connected by way of a pipe 15 to cooling fluid inlet 18 of operating equipment 12. In such an embodiment, thermal control for operating equipment 12 can be provided by any combination of radiator 20, chiller 28, and/or heater 56.

A heater flow valve 62 may be positioned in a pipe 15 to control the flow of coolant through heater 56. As illustrated here, heater flow valve 62 may be positioned upstream of heater inlet 58. In other embodiments, heater flow valve 62 may be positioned downstream of heater outlet 60.

In such an embodiment, controller 48 may be operably connected to each of radiator flow valve 50, evaporator flow valve 52, and heater flow valve 62 to control the flow of coolant through radiator 20, evaporator 40, and heater 56, respectively. Thus, controller 48 can allow coolant exiting operating equipment 12 to flow only through radiator 20, only through evaporator 40, only through heater 56, or through any combination of radiator 20, evaporator 40, and heater 56.

Various embodiments of a hybrid heat transfer assembly have been described herein, which include various components and features. In other embodiments, the hybrid heat transfer assembly may be provided with any combination of such components and features. It is also understood that in other embodiments, the various devices, components, and features of the cooling assembly described herein may be constructed with similar structural and functional elements having different configurations, including different ornamental appearances.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims.

What is claimed is:

1. A hybrid heat transfer assembly comprising:
   operating equipment including a cooling fluid inlet and a cooling fluid outlet;
   a radiator having a radiator inlet connected to the cooling fluid outlet via a coolant loop, and a radiator outlet connected to the cooling fluid inlet via the coolant loop;
   a radiator fan proximate the radiator and configured to direct air across the radiator; and
   a chiller comprising:
   an evaporator having an evaporator inlet connected to the radiator outlet via the coolant loop, and an evaporator outlet connected to the cooling fluid inlet via the coolant loop such that the radiator and the evaporator are connected to the operating equipment along the coolant loop in series;
   a compressor connected to the evaporator;
   a condenser connected to the compressor;
   an expansion valve connected to the condenser and the evaporator;
   a refrigerant loop connecting the evaporator to the compressor, the condenser to the compressor, and the expansion valve to the condenser and the evaporator; and
   a condenser fan proximate the condenser and configured to direct air across the condenser.

2. The hybrid heat transfer assembly of claim 1, further comprising a temperature sensor positioned in the coolant loop.

3. The hybrid heat transfer assembly of claim 2, further comprising a controller operably connected to the temperature sensor and the compressor.

4. The hybrid heat transfer assembly of claim 3, wherein the controller is configured to turn the compressor on and off.

5. The hybrid heat transfer assembly of claim 3, wherein the controller is configured to provide variable speed control of the compressor.

6. The hybrid heat transfer assembly of claim 1, further comprising a heater having a heater inlet connected to the cooling fluid outlet via the coolant loop, and a heater outlet connected to the cooling fluid inlet via the coolant loop.

7. The hybrid heat transfer assembly of claim 6, wherein the radiator, the evaporator, and the heater are connected to the operating equipment in series.

8. The hybrid heat transfer assembly of claim 1, further comprising:
   a heater having a heater inlet connected to the cooling fluid outlet via the coolant loop, and a heater outlet connected to the cooling fluid inlet via the coolant loop;
   a temperature sensor positioned in the coolant loop between the evaporator outlet and the cooling fluid inlet;
   a radiator flow valve configured to control flow of cooling fluid through the radiator;
   an evaporator flow valve configured to control flow of cooling fluid through the evaporator;
   a heater flow valve configured to control flow of cooling fluid through the heater; and
   a controller operably connected to the temperature sensor, the radiator flow valve, the evaporator flow valve, the heater, and the heater flow valve, and configured to control operation of the radiator flow valve, the evaporator flow valve, the heater, and the heater flow valve.

9. The hybrid heat transfer assembly of claim 8, wherein the controller is configured to control operation of the radiator fan and the condenser fan.

10. The hybrid heat transfer assembly of claim 1, wherein the operating equipment comprises one of a battery and a fuel cell.

11. A hybrid heat transfer assembly comprising:
   operating equipment including a cooling fluid inlet and a cooling fluid outlet;
   a radiator having a radiator inlet connected to the cooling fluid outlet via a coolant loop and a radiator outlet, connected to the cooling fluid inlet via the coolant loop;
   a radiator fan proximate the radiator and configured to direct air across the radiator;
   a chiller comprising:
   an evaporator having an evaporator inlet connected to the radiator outlet via the coolant loop, and an evaporator outlet connected to the cooling fluid inlet via the coolant loop such that the radiator and the evaporator are connected to the operating equipment along the coolant loop in series;

a compressor connected to the evaporator;
a condenser connected to the compressor;
an expansion valve connected to the condenser and the evaporator;
a refrigerant loop connecting the evaporator to the compressor, the condenser to the compressor, and the expansion valve to the condenser and the evaporator; and
a condenser fan proximate the condenser and configured to direct air across the condenser;
a temperature sensor positioned in the coolant loop between the evaporator outlet and the cooling fluid inlet; and
a controller operably connected to the temperature sensor and the compressor and configured to control operation of the compressor.

12. The hybrid heat transfer assembly of claim 11, wherein the controller is configured to turn the compressor on and off.

13. The hybrid heat transfer assembly of claim 11, wherein the controller is configured to provide variable speed control of the compressor.

14. The hybrid heat transfer assembly of claim 11, wherein the controller is configured to control operation of the radiator fan and the condenser fan.

15. The hybrid heat transfer assembly of claim 11, wherein the operating equipment comprises one of a battery and a fuel cell.

16. A hybrid heat transfer assembly comprising:
operating equipment including a cooling fluid inlet and a cooling fluid outlet;
a radiator having a radiator inlet connected to the cooling fluid outlet via a coolant loop, a radiator flow valve configured to control flow of cooling fluid through the radiator, and a radiator outlet connected to the cooling fluid inlet via the coolant loop;
a radiator fan proximate the radiator and configured to direct air across the radiator;
a chiller comprising:
an evaporator having an evaporator inlet connected to the radiator outlet via the coolant loop, an evaporator flow valve configured to control flow of cooling fluid through the evaporator, and an evaporator outlet connected to the cooling fluid inlet via the coolant loop such that the radiator and the evaporator are connected to the operation equipment along the coolant loop in series;
a compressor connected to the evaporator;
a condenser connected to the compressor;
an expansion valve connected to the condenser and the evaporator;
a refrigerant loop connecting the evaporator to the compressor, the condenser to the compressor, and the expansion valve to the condenser and the evaporator; and
a condenser fan proximate the condenser and configured to direct air across the condenser;
a heater having a heater inlet connected to the cooling fluid outlet via the coolant loop, a heater flow valve configured to control flow of cooling fluid through the heater, and a heater outlet connected to the cooling fluid inlet via the coolant loop;
a temperature sensor positioned in the coolant loop; and
a controller operably connected to the temperature sensor, the compressor, the radiator flow valve, the evaporator flow valve, the heater, and the heater flow valve, and configured to control operation of the compressor, the radiator flow valve, the evaporator flow valve, the heater, and the heater flow valve.

17. The hybrid heat transfer assembly of claim 16, wherein the controller is configured to turn the compressor on and off.

18. The hybrid heat transfer assembly of claim 16, wherein the controller is configured to provide variable speed control of the compressor.

19. The hybrid heat transfer assembly of claim 16, wherein the controller is configured to control operation of the radiator fan and the condenser fan.

20. The hybrid heat transfer assembly of claim 16, wherein the operating equipment comprises one of a battery and a fuel cell.

* * * * *